United States Patent
Iwasaki

(10) Patent No.: US 9,735,429 B2
(45) Date of Patent: Aug. 15, 2017

(54) LITHIUM ION SECONDARY BATTERY

(75) Inventor: Tomio Iwasaki, Tokyo (JP)

(73) Assignee: HITACHI, LTD., Tokyo (JP)

(*) Notice: Subject to any disclaimer, the term of this patent is extended or adjusted under 35 U.S.C. 154(b) by 273 days.

(21) Appl. No.: 14/404,350

(22) PCT Filed: May 31, 2012

(86) PCT No.: PCT/JP2012/064060
§ 371 (c)(1),
(2), (4) Date: Nov. 26, 2014

(87) PCT Pub. No.: WO2013/179437
PCT Pub. Date: Dec. 5, 2013

(65) Prior Publication Data
US 2015/0155563 A1    Jun. 4, 2015

(51) Int. Cl.
*H01B 1/02* (2006.01)
*H01M 4/62* (2006.01)
(Continued)

(52) U.S. Cl.
CPC ........... *H01M 4/622* (2013.01); *H01M 4/131* (2013.01); *H01M 4/133* (2013.01); *H01M 4/485* (2013.01);
(Continued)

(58) Field of Classification Search
CPC ........ H01M 4/131; H01M 4/13; H01M 4/622; H01M 4/139; H01M 4/623; H01B 1/02–1/04
(Continued)

(56) References Cited

U.S. PATENT DOCUMENTS 5,635,312 A * 6/1997 Yanagisawa ............ H01M 6/10
429/131
5,750,287 A * 5/1998 Kinoshita ............. H01M 4/583
429/217
(Continued)

FOREIGN PATENT DOCUMENTS

JP    07-065863 A    3/1995
JP    09-231976 A    9/1997
(Continued)

OTHER PUBLICATIONS

European Office Action dated Dec. 8, 2015 for Appln. No. 12878179.6, 8 pages.
(Continued)

*Primary Examiner* — Tri V Nguyen
(74) *Attorney, Agent, or Firm* — Volpe and Koenig, P.C.

(57) ABSTRACT

A lithium ion secondary battery includes a binder that binds an active material to a current collector in the positive electrode or negative electrodes or both. The binder contains a base material including a resin having a benzene ring, and a polyacene additive selected from the group consisting of naphthalene, anthracene, tetracene, and derivatives thereof. The active material is a carbonaceous material or a lithium-containing composite oxide having a crystal structure in which a distance between nearest oxygen atoms is 0.19 to 0.29 nm. Adhesion of the binder to the active material during the manufacturing of the lithium ion secondary battery is led to a closest-packed crystal plane in the crystal structure of the active material, so that inhibition of moving of lithium ions in and out of the active material due to the binder may be reduced.

10 Claims, 4 Drawing Sheets

(51) Int. Cl.
*H01M 4/131* (2010.01)
*H01M 4/133* (2010.01)
*H01M 10/0525* (2010.01)
*H01M 4/485* (2010.01)
*H01M 4/505* (2010.01)
*H01M 4/525* (2010.01)

(52) U.S. Cl.
CPC ......... *H01M 4/62* (2013.01); *H01M 10/0525* (2013.01); *H01M 4/505* (2013.01); *H01M 4/525* (2013.01); *H01M 2220/30* (2013.01)

(58) Field of Classification Search
USPC ................. 252/500–521.8, 182.1; 429/217
See application file for complete search history.

(56) References Cited

U.S. PATENT DOCUMENTS

| | | | | |
|---|---|---|---|---|
| 2008/0191199 | A1* | 8/2008 | Anemian | C07C 15/28 257/40 |
| 2008/0318124 | A1 | 12/2008 | Horiuchi et al. | |
| 2009/0291366 | A1 | 11/2009 | Stevanovic et al. | |
| 2010/0021819 | A1* | 1/2010 | Zhamu | H01G 9/058 429/231.8 |
| 2012/0132849 | A1* | 5/2012 | Fan | H01M 4/0471 252/182.1 |
| 2013/0224592 | A1* | 8/2013 | Iwasaki | H01M 4/13 429/217 |
| 2013/0288126 | A1* | 10/2013 | Liu | H01M 4/622 429/217 |
| 2013/0323590 | A1* | 12/2013 | Kageura | H01M 4/131 429/211 |

FOREIGN PATENT DOCUMENTS

| | | |
|---|---|---|
| JP | 09-232001 A | 9/1997 |
| JP | 10-106579 A | 4/1998 |
| JP | 2009-224288 A | 10/2009 |
| JP | 2011-521430 A | 7/2011 |
| WO | 2012/066600 A1 | 5/2012 |

OTHER PUBLICATIONS

European Office Action dated May 24, 2016 for Appln. No. 12878179.6.

The Electronic Structures of Polyacene and Polyphenanthrene, Tanaka et al., J. Phys. Chem. Solids, vol. 44, No. 11, pp. 1069-1075, 1983.

\* cited by examiner

OXYGEN ATOM

OXYGEN ATOM
COBALT ATOM
OXYGEN ATOM

LITHIUM ION SECONDARY BATTERY

TECHNICAL FIELD

The present invention relates to a lithium ion secondary battery having a characteristic electrode configuration.

BACKGROUND ART

Lithium ion secondary batteries, nickel-cadmium storage batteries, and nickel hydride storage batteries are widely used as power sources for portable information-communication terminals including cellular phones and notebook-size personal computers, and for video cameras and portable music players, or the like. Among the batteries, the lithium ion secondary batteries, which are superior in properties such as high energy density and high output density, have been rapidly researched and developed since the debut thereof, and have established themselves as standard batteries for these consumer appliances.

With increase in functionality of the portable information-communication terminals, the lithium ion secondary batteries (hereinafter also simply referred to as "batteries" (or "a battery")) serving as power sources require further higher energy densities, i.e., require further higher capacities. In addition, the batteries require longer cycle lives in consideration of environmental standpoints.

In general, a lithium ion secondary battery includes a positive electrode, a negative electrode, a separator, and a nonaqueous electrolyte solution. For example, the positive electrode and the negative electrode are obtained by mixing an active material, a conductive material for imparting electrical conductivity, and a binder for binding these components in a solvent, and applying the mixture to a current collector including a metal foil or the like.

For example, as described in PTL 1, polyvinylidene fluoride (PVDF) which is less likely to be deteriorated even when it is brought into contact with an electrolyte solution is conventionally used as a binder. However, when PVDF is used as the binder, adhesion with the current collector is insufficient, which makes it difficult to improve a cycle life. Consequently, in these days, styrene-butadiene rubber and a polyimide-based resin which can achieve high adhesion with the current collector are used as the binder.

CITATION LIST

Patent Literature

PTL 1: JP 2009-224288 A

SUMMARY OF INVENTION

Technical Problem

When the styrene-butadiene rubber and the polyimide-based resin are used as the binder, the binder covers a crystal plane which lithium ions move in and out of, in the active material, which disadvantageously causes inhibition of moving of the lithium ions in and out of. Then, it is a purpose of the present embodiment to find a binder having high adhesion with a current collector without causing inhibition of absorption and desorption of lithium ions in an active material, and to provide a lithium ion secondary battery having high performance and a long life.

Solution to Problem

The present inventor found that the above-mentioned problem could be solved by adding polyacene or a derivative thereof as an additive to a binder. The present embodiment relates to a lithium ion secondary battery including a binder that binds an active material to a current collector in at least one of the positive electrode and the negative electrode, wherein the binder comprises a base material including a resin having a benzene ring, and a polyacene additive selected from the group consisting of naphthalene, anthracene, tetracene, and derivatives thereof, and the active material is a carbonaceous material or a lithium-containing composite oxide having a crystal structure in which a distance between nearest oxygen atoms is 0.19 to 0.29 nm.

Advantageous Effects of Invention

According to the configuration of the lithium ion secondary battery of the present embodiment, adhesion of the binder to the active material during the manufacturing of the lithium ion secondary battery leads to a closest-packed crystal plane in the crystal structure of the active material, so that inhibition of moving of lithium ions in and out of the active material due to the binder can be reduced. According to the present embodiment, the lithium ion secondary battery having higher performance can be provided.

DESCRIPTION OF EMBODIMENTS

As in a conventional lithium ion secondary battery, a lithium ion secondary battery of the present embodiment has a configuration in which a positive electrode and a negative electrode are laid on each other via a separator, and the positive electrode, the negative electrode, and a nonaqueous electrolyte solution are hermetically sealed in a can including iron and aluminum or the like, or a container including an aluminum laminate film. The lithium ion secondary battery can have a shape such as a square shape or a cylindrical shape according to the shape of the container. Hereinafter, the configuration and manufacturing method of the lithium ion secondary battery of the present embodiment will be described in detail.

1. Electrode (Positive Electrode/Negative Electrode)

As in the conventional lithium ion secondary battery, electrodes (positive electrode and negative electrode) of the lithium ion secondary battery of the present embodiment are obtained by, for example, dispersing an active material, a conductive material used if needed and serving to improve the electrical conductivity of the electrode, and a binder in a solvent to prepare an electrode coating ink, applying the electrode coating ink to a current collector including a metal foil or the like, and drying the electrode coating ink to remove the solvent. Therefore, the electrodes of the lithium ion secondary battery of the present embodiment have a structure in which the active material and the conductive material used if needed are bound to the current collector by the binder.

In the present embodiment, the binder contains a base material including a resin having a benzene ring, and a polyacene additive selected from the group consisting of naphthalene, anthracene, tetracene, and derivatives thereof. Since the benzene ring contained in the base material of the binder interacts with a benzene ring of polyacene, the base material of the binder exhibits the behavior that it is attracted to movement of the polyacene.

In the present embodiment, the active material is a carbonaceous material or a lithium-containing composite oxide having a crystal structure in which a distance between nearest oxygen atoms is 0.19 to 0.29 nm. Such an active material has a structure corresponding to the polyacene in a closest-packed crystal plane in the crystal structure.

Figure 1:
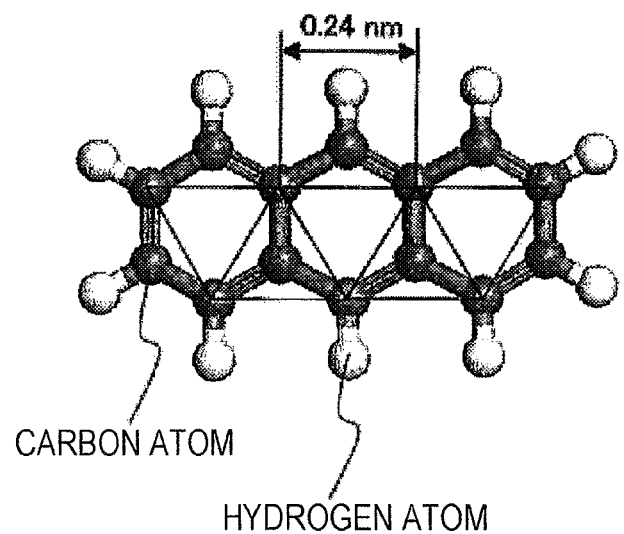
FIG. 1 illustrates a molecular structure of anthracene which is a kind of polyacene.

FIG. 1 illustrates a molecular structure of anthracene which is a kind of the polyacene. Polyacene having two or more linearly condensed benzene rings can be characterized in that it has a structure where one side of an equilateral triangle formed by three carbon atoms has a length of 0.24 nm, as illustrated in FIG. 1.

Figure 2:
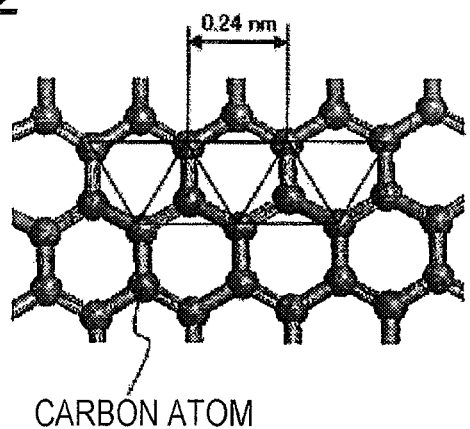
FIG. 2 illustrates atomic arrangement of a closest-packed crystal plane of a carbonaceous material.

FIG. 2 illustrates atomic arrangement of a closest-packed crystal plane of the carbonaceous material. In general, the carbonaceous material which is a graphite-based material has a structure characterized by an equilateral triangle having one side of 0.24 nm in the closest-packed crystal plane, as in the polyacene. That is, the carbonaceous material can be said to have a structure corresponding to the polyacene in the closest-packed crystal plane in the crystal structure.

Figure 3:
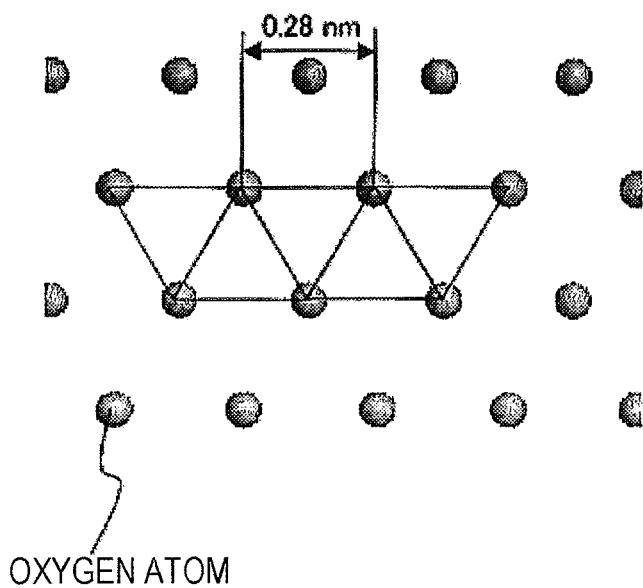
FIG. 3 illustrates an oxygen layer as an example for atomic arrangement of a closest-packed crystal plane in lithium cobaltate ($LiCoO_2$).

FIG. 3 illustrates an oxygen layer as an example for atomic arrangement of a closest-packed crystal plane in lithium cobaltate ($LiCoO_2$). The lithium cobaltate has a structure characterized by an equilateral triangle having one side of 0.28 nm in the closest-packed crystal plane. Since the difference between the sizes of the equilateral triangles of the lithium cobaltate and polyacene is minimal, the lithium cobaltate can also be said to have a structure very similar to that of the polyacene. Thus, a lithium-containing composite oxide in which a distance between nearest oxygen atoms is 0.19 to 0.29 nm can also be said to have a structure corresponding to the polyacene in a closest-packed crystal plane in a crystal structure.

Figure 4:
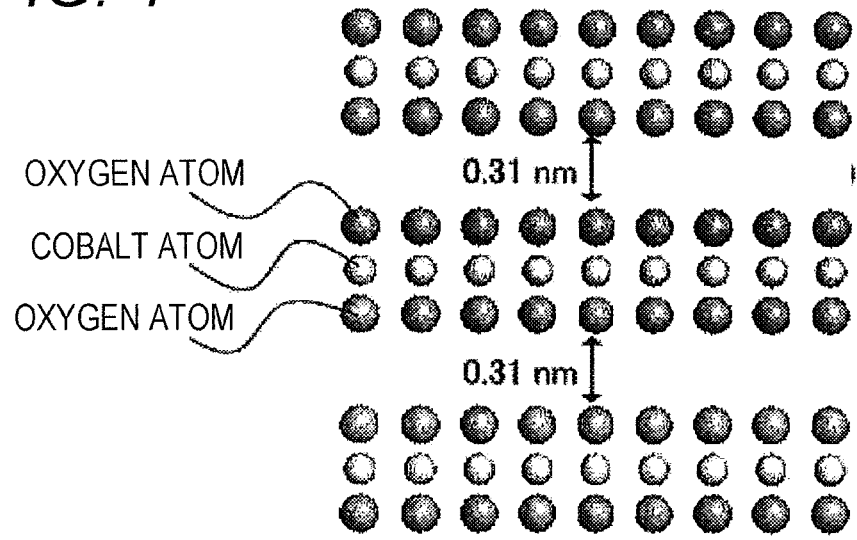
FIG. 4 illustrates atomic arrangement of a crystal plane perpendicular to a closest-packed crystal plane in lithium cobaltate.

FIG. 4 illustrates atomic arrangement of a crystal plane perpendicular to the closest-packed crystal plane in the lithium cobaltate. In the crystal plane, lithium moves in and out of an interatomic spacing of 0.31 nm illustrated in FIG. 4. The structure corresponding to the polyacene is not present in the crystal plane perpendicular to the closest-packed crystal plane.

When the binder containing the base material including the resin having a benzene ring, and the polyacene additive, and the active material are mixed when the active material has the structure corresponding to the polyacene as illustrated in FIGS. 2 and 3 in the closest-packed crystal plane, the polyacene in the binder has low free energy and is stable when the polyacene adheres to a closest-packed crystal plane having a similar atomic arrangement, which maintains a state in which the polyacene adheres to the closest-packed crystal plane. On the other hand, when the polyacene in the binder adheres to the other crystal plane having completely different atomic arrangement, for example, a plane which the lithium moves in and out of, as illustrated in FIG. 4, the polyacene has high free energy, which cannot maintain a state where the polyacene is kept to adhere to the plane. The polyacene moves to the closest-packed crystal plane in order to require a stable energetic state (migration). In this case, the base material of the binder is attracted to the movement of the polyacene according to the above interaction between the benzene rings (the series of molecular behaviors are confirmed in the simulation). As a result, for example, in a heating step for drying a solvent, or the like, in an electrode manufacturing process, the binder is directed away from the crystal plane which the lithium of the active material moves in and out of, and moves to the closest-packed crystal plane. Thereby, inhibition of moving of the lithium in and out of due to the covering of the binder is reduced. Therefore, according to the combination of the active material and binder of the present embodiment, a very high lithium insertion rate and lithium desorption rate are obtained when the lithium ion secondary battery is produced.

When the polyacene is covalently-bonded to the base material of the binder, the polyacene is restrained by the base material of the binder, which is considered to be less likely to generate the migration. Therefore, the effect of the present embodiment is considered to be obtained by the attraction between the polyacene and the base material of the binder by an intermolecular interaction such as van der Waals force or a hydrogen bond.

A resin having a benzene ring and generally used in the lithium ion secondary battery can be suitably used as the base material of the binder. Preferable examples of the base material of the binder in the present embodiment include styrene-butadiene rubber and aromatic polyimide. Examples of the aromatic polyimide include condensed-type polyimide formed by an aromatic tetracarboxylic dianhydride and an aromatic diamine.

Examples of the aromatic tetracarboxylic dianhydride include:

pyromellitic dianhydride, 3,3',4,4'-benzophenone tetracarboxylic dianhydride, bis(3,4-dicarboxyphenyl)ether dianhydride, bis(3,4-dicarboxyphenyl)sulfone dianhydride, bis(3,4-dicarboxyphenyl)methanedianhydride, 2,2-bis(3,4-dicarboxyphenyl)propanedianhydride, 2,2-bis(3,4-dicarboxyphenyl)hexafluoropropanedianhydride, 1,4-bis(3,4-dicarboxyphenoxy)benzenedianhydride, 1,4-bis(3,4-dicarboxyphenoxy)biphenyl dianhydride, 2,2-bis[(3,4-dicarboxyphenoxy)phenyl]propanedianhydride, 2,3,6,7-naphthalene tetracarboxylic dianhydride, 1,4,5,8-naphthalene tetracarboxylic dianhydride, 2,2',3,3'-benzophenone tetracarboxylic dianhydride, 2,2',3,3'-biphenyl tetracarboxylic dianhydride, 2,2-bis(2,3-dicarboxyphenyl)propanedianhydride, 2,2-bis(2,3-dicarboxyphenyl)hexafluoropropanedianhydride, bis(2,3-dicarboxyphenyl)ether dianhydride, bis(2,3-dicarboxyphenyl)sulfone dianhydride, bis(2,3-dicarboxyphenyl)methanedianhydride, 1,1-bis(2,3-dicarboxyphenyl)ethanedianhydride, 1,1-bis(3,4-dicarboxyphenyl)ethanedianhydride, 1,2-bis(2,3-dicarboxyphenyl)ethanedianhydride, 1,2-bis(3,4-dicarboxyphenyl)ethanedianhydride, 1,3-bis(2,3-dicarboxyphenoxy)benzenedianhydride, 1,3-bis(3,4-dicarboxyphenoxy)benzenedianhydride, 1,4-bis(2,3-dicarboxyphenoxy)benzenedianhydride, 1,2,5,6-naphthalene tetracarboxylic dianhydride, 1,2,3,4-benzenetetracarboxylic acid dianhydride, 3,4,9,10-perylene tetracarboxylic dianhydride, 2,3,6,7-anthracene tetracarboxylic dianhydride and 1,2,7,8-phenanthrene tetracarboxylic dianhydride.

Examples of the aromatic diamine include:

m-phenylenediamine, o-phenylene diamine, p-phenylene diamine, m-aminobenzyl amine, o-aminobenzyl amine, p-aminobenzyl amine, 3-chloro-1,2-phenylenediamine, 4-chloro-1,2-phenylenediamine, 2,3-diaminotoluene, 2,4-diaminotoluene, 2,5-diaminotoluene, 2,6-diaminotoluene, 3,4-diaminotoluene, 3,5-diaminotoluene, 2-methoxy-1,4-phenylenediamine, 4-methoxy-1,2-phenylenediamine, 4-methoxy-1,3-phenylenediamine, 3,3'-dichlorobenzidine, 3,3'-dimethylbenzidine, 3,3'-dimethoxybenzidine, 3,3'-diaminodiphenyl ether, 3,3'-diamino-5,5'-ditrifluoromethyl diphenyl ether, 3,4'-diaminodiphenyl ether, 4,4'-diaminodiphenyl ether, 3,3'-diamino diphenyl sulfide, 3,4'-diamino diphenyl sulfide, 4,4'-diamino diphenyl sulfide, 3,3'-diaminodiphenyl sulfone, 3,4'-diaminodiphenyl sulfone, 4,4'-diaminodiphenyl sulfone, 3,3'-diaminobenzophenone, 3,3'-diamino-4,4'-dichlorobenzophenone, 3,3'-diamino-4,4'-dimethoxybenzophenone, 3,3'-diamino-4-phenoxybenzophenone, 3,3'-diamino-4,4'-diphenoxybenzophenone, 3,3'-diamino-4-(4-phenyl) phenoxybenzophenone, 3,3'-diamino-4,4'-di(4-phenylphenoxy)benzophenone, 3,3'-diaminodiphenylmethane, 3,4'-diaminodiphenylmethane, 4,4'-diaminodiphenylmethane, 2,2-bis(3-aminophenyl)propane, 2,2-bis(4-aminophenyl)propane, 2,2-bis(3-aminophenyl)-1,1,1,3,3,3-hexafluoropropane, 2,2-bis(4-aminophenyl)-1,1,1,3,3,3-hexafluoropropane, 3,3'-diamino diphenyl sulfoxide, 3,4'-diamino diphenyl sulfoxide, 4,4'-diamino diphenyl sulfoxide, 1,3-bis(3-aminophenyl)benzene, 1,3-bis(4-aminophenyl)benzene, 1,4-bis(3-aminophenyl)benzene, 1,4-bis(4-aminophenyl)benzene, 1,3-bis(4-aminophenoxy)benzene, 1,4-bis(3-aminophenoxy)benzene, 1,4-bis(4-aminophenoxy)benzene, 1,3-bis(3-aminobenzoyl)benzene, 1,3-bis(4-aminobenzoyl)benzene, 1,4-bis(3-aminobenzoyl)benzene, 1,4-bis(4-aminobenzoyl)benzene, 1,3-bis(3-aminophenyl sulfide)benzene, 1,3-bis(4-aminophenyl sulfide)benzene, 1,4-bis(4-aminophenyl sulfide)benzene, 1,3-bis(3-aminophenyl sulfone)benzene, 1,3-bis(4-aminophenyl sulfone)benzene, 1,4-bis(4-aminophenyl sulfone)benzene, 1,3-bis(3-aminobenzyl)benzene, 1,3-bis(4-aminobenzyl)benzene, 1,4-bis(4-aminobenzyl)benzene, 1,3-bis(3-amino-α,α-dimethylbenzyl)benzene, 1,3-bis(4-amino-α,α-dimethylbenzyl)benzene, 1,4-bis(3-amino-α,α-dimethylbenzyl)benzene, 1,4-bis(4-amino-α,α-dimethylbenzyl)benzene, 1,3-bis(3-aminophenoxy)-4-trifluoromethyl benzene, 1,3-bis(3-aminophenoxy)-5-trifluoromethyl benzene, 1,3-bis(4-aminophenoxy)-4-trifluoromethyl benzene, 1,3-bis(4-aminophenoxy)-5-trifluoromethyl benzene, 1,4-bis(3-aminophenoxy)-3-trifluoromethyl benzene, 1,4-bis(4-aminophenoxy)-5-trifluoromethyl benzene, 1,3-bis(3-amino-5-trifluoro methylphenoxy)benzene, 1,3-bis(3-amino-4-trifluoro methylphenoxy)benzene, 1,3-bis(4-amino-2-trifluoro methylphenoxy)benzene, 1,4-bis(4-amino-3-trifluoro methylphenoxy)benzene, 1,4-bis(3-amino-5-trifluoro methylphenoxy)benzene, 1,4-bis(3-amino-4-trifluoro methylphenoxy)benzene, 1,4-bis(4-amino-2-trifluoro methylphenoxy)benzene, 1,4-bis(4-amino-3-trifluoro methylphenoxy)benzene, 1,3-bis(3-amino-5-trifluoro methylphenoxy)-4-trifluoromethyl benzene, 1,3-bis(3-amino-5-trifluoro methylphenoxy)-5-trifluoromethyl benzene, 1,3-bis(3-amino-4-trifluoro methylphenoxy)-4-trifluoromethyl benzene, 1,3-bis(3-amino-trifluoro methylphenoxy)-5-trifluoromethyl benzene, 1,3-[(3-amino)-α,α-bis(trifluoromethyl)benzyl]benzene, 1,3-[(4-amino)-α,α-bis(trifluoromethyl)benzyl]benzene, 1,4-[(3-amino)-α,α-bis(trifluoromethyl)benzyl]benzene, 1,4-[(4-amino)-α,α-bis(trifluoromethyl)benzyl]benzene, 1,3-bis(3-amino-4-fluorobenzoyl)benzene, 1,3-bis(3-amino-4-phenoxybenzoyl)benzene, 1,3-bis[3-amino-4-(4-phenylphenoxybenzoyl)benzene)2,6-bis(3-aminophenoxy) benzonitrile, 1,3-bis(4-aminophenoxy)-2-phenylbenzene, 1,3-bis[(2-(3-aminophenyl)isopropyl)]benzene, 1,3-bis[(2-(4-aminophenyl)isopropyl)]benzene, 1,4-bis[(2-(3-aminophenyl)isopropyl)]benzene, 1,4-bis[(2-(4-aminophenyl)isopropyl)]benzene, 3,3'-bis(3-aminophenoxy)biphenyl, 3,3'-bis(4-aminophenoxy)biphenyl, 4,4'-bis(3-aminophenoxy)biphenyl, 4,4'-bis(4-aminophenoxy)biphenyl, bis[3-(3-aminophenoxyl)phenyl]ether,bis[3-(4-aminophenoxy)phenyl]ether, bis[4-(3-aminophenoxyl)phenyl]ether, bis[4-(4-aminophenoxyl)phenyl]ether, bis[3-(3-aminophenoxyl)phenyl]ketone, bis[3-(4-aminophenoxyl)phenyl]ketone, bis[4-(3-aminophenoxyl)phenyl]ketone, bis[4-(4-aminophenoxyl)phenyl]ketone, bis[3-(3-aminophenoxyl)phenyl]sulfide, bis[3-(4-aminophenoxyl)phenyl]sulfide, bis[4-(3-aminophenoxyl)phenyl]sulfide, bis[4-(4-aminophenoxyl)phenyl]sulfide, bis[3-(3-aminophenoxyl)phenyl]sulfone, bis[3-(4-aminophenoxyl)phenyl]sulfone, bis[4-(3-aminophenoxyl)phenyl]sulfone, bis[4-(4-aminophenoxyl)phenyl]sulfone, bis[3-(3-aminophenoxyl)phenyl]methane, bis[3-(4-aminophenoxyl)phenyl]methane, bis[4-(3-aminophenoxyl)phenyl]methane, bis[4-(4-aminophenoxyl)phenyl]methane, 2,2-bis[3-(3-aminophenoxyl)phenyl]propane, 2,2-bis[(3-(4-aminophenoxyl)phenyl)]propane, 2,2-bis[(4-(3-aminophenoxyl)phenyl)]propane, 2,2-bis[(4-(4-aminophenoxyl)phenyl)]propane, 2,2-bis[3-(3-aminophenoxyl)phenyl]-1,1,1,3,3,3-hexafluoropropane, 2,2-bis[3-(4-aminophenoxyl)phenyl]-1,1,1,3,3,3-hexafluoropropane, 2,2-bis[4-(3-aminophenoxyl)phenyl]-1,1,1,3,3,3-hexafluoropropane, 2,2-bis[4-(4-aminophenoxyl)phenyl]-1,1,1,3,3,3-hexafluoropropane, 4,4'-bis(3-aminophenoxy)-3-methylbiphenyl, 4,4'-bis(3-aminophenoxy)-3,3'-dimethylbiphenyl, 4,4'-bis(3-aminophenoxy)-3,5-dimethylbiphenyl, 4,4'-bis(3-aminophenoxy)-3,3',5,5'-tetramethyl biphenyl, 4,4'-bis(3-aminophenoxy)-3,3'-dichlorobiphenyl, 4,4'-bis(3-aminophenoxy)-3,5-dichlorobiphenyl, 4,4'-bis(3-aminophenoxy)-3,3',5,5'-tetrachlorobiphenyl, 4,4'-bis(3-aminophenoxy)-3,3'-dibromobiphenyl, 4,4'-bis(3-aminophenoxy)-3,5-dibromobiphenyl, 4,4'-bis(3-aminophenoxy)-3,3',5,5'-tetrabromo biphenyl, 1,1-bis[(4-(3-aminophenoxyl)phenyl)]ethane, 1,1-bis[(4-(4-aminophenoxyl)phenyl)]ethane, 1,2-bis[(4-(3-aminophenoxyl)phenyl)]ethane, 1,2-bis[(4-(4-aminophenoxyl)phenyl)]ethane, 1,1-bis[(4-(3-aminophenoxyl)phenyl)]propane, 1,1-bis[(4-(4-aminophenoxyl)phenyl)]propane, 1,2-bis[(4-(3-aminophenoxyl)phenyl)]propane, 1,2-bis[(4-(4-aminophenoxyl)phenyl)]propane, 1,3-bis[(4-(3-aminophenoxyl)phenyl)]propane, 1,3-bis[(4-(4-aminophenoxyl)phenyl)]propane, 2-[4-(4-aminophenoxyl)phenyl]-2-[4-(4-aminophenoxy)-3-methyl phenyl]propane, 2,2-bis[(4-(4-aminophenoxy)-3-methylphenyl)]propane, 2-[4-(4-aminophenoxy)phenyl]-2-[4-(4-aminophenoxy)-3,5-dimethylphenyl]propane, 2,2-bis[(4-(4-aminophenoxy)-3,5-dimethylphenyl)]propane, 1,1-bis[(4-(3-aminophenoxyl) phenyl)]butane, 1,1-bis[(4-(4-aminophenoxyl)phenyl)]butane, 1,2-bis[(4-(3-aminophenoxyl)phenyl)]butane, 1,2-bis[(4-(4-aminophenoxyl)phenyl)]butane, 1,3-bis[(4-(3-aminophenoxyl)phenyl)]butane, 1,3-bis[(4-(4-aminophenoxyl)phenyl)]butane, 1,4-bis[(4-(3-aminophenoxyl)phenyl)]butane, 1,4-bis[(4-(4- aminophenoxyl)phenyl)]butane, 2,2-bis[(4-(3-aminophenoxyl)phenyl)]butane, 2,2-bis[(4-(4-aminophenoxyl)phenyl)]butane, 2,3-bis[(4-(3-aminophenoxyl)phenyl)]butane, 2,3-bis[(4-(4-aminophenoxyl)phenyl)]butane, bis[4-(3-aminophenoxy)-3-methoxypheny]sulfide,[4-(3-aminophenoxy)phenyl][4-(3-aminophenoxy)-3,5-dimethoxyphenyl] sulfide, bis[4-(3-aminophenoxy)-3,5-dimethoxyphenyl] sulfide, bis[3-(3-aminophenoxyl)phenyl]sulfoxide, bis[3-(4-aminophenoxyl)phenyl]sulfoxide, bis[4-(3-aminophenoxyl)phenyl]sulfoxide, bis[4-(4-aminophenoxyl)phenyl]sulfoxide, 1,3-bis[4-(4-aminophenoxyl)benzoyl]benzene, 1,3-bis[(4-(3-aminophenoxyl)benzoyl)]benzene, 1,4-bis[(4-(4-aminophenoxyl)benzoyl)]benzene, 1,4-bis[(4-(3-aminophenoxyl)benzoyl)]benzene, 6,6'-bis(4-aminophenoxy)-3,3,3',3'-tetramethyl 11'-spirobiindan, 6,6'-bis(3-aminophenoxy)-3,3,3',3'-tetramethyl 11'-spirobiindan, 1,3-bis[(4-(4-aminophenoxy)-α,α-dimethylbenzyl)]benzene, 1,3-bis[(4-(3-aminophenoxy)-α,α-dimethylbenzyl)]benzene, 1,4-bis[(4-(4-aminophenoxy)-α,α-dimethylbenzyl)]benzene and 1,4-bis[4-(3-aminophenoxy)-α,α-dimethylbenzyl)]benzene.

Condensed-type polyimide formed by an aromatic tetracarboxylic dianhydride which is pyromellitic acid dianhydride or biphenyl tetracarboxylic dianhydride, and an aromatic diamine which is m-phenylenediamine, o-phenylenediamine, p-phenylenediamine, 3,4'-diamino diphenyl ether, or 4,4'-diamino diphenyl ether can be suitably used as the aromatic polyimide used as the base material of the binder in the present embodiment. Specifically, those commercially available in trade names of "Kapton" (registered trademark: E.I. du Pont de Nemours and Company), and "Upilex" (registered trademark: Ube Industries, Ltd.) can be suitably used as the aromatic polyimide.

The polyacene which can be used as the polyacene additive in the present embodiment is naphthalene, anthracene, or tetracene. It is considered that when the number of the benzene rings of the polyacene is excessive, the rate of the migration is decreased, which does not provide a desired effect. However, tetracene having benzene rings of 4 or less sufficiently provides the effect of the present embodiment.

Derivatives of naphthalene, anthracene, and tetracene can also be used as the polyacene additive. Examples of the derivatives include naphthalene, anthracene, or tetracene substituted with 1 to 4, preferably 1 to 3, and particularly preferably 1 to 2 substituent groups independently selected from the group consisting of halogen (F, Cl, Br, I), a hydroxyl group, a carboxyl group, an aldehyde group, an amino group, a cyano group, a methyl group, an ethyl group, a hydroxymethyl group, a hydroxyethyl group, a methoxy group, an ethoxy group, a halomethyl group, and a haloethyl group.

From the viewpoints of the interaction with the base material of the binder, and the rate of the migration, or the like, the polyacene additive is most preferably anthracene and a derivative thereof. The polyacene additive is preferably added in a concentration of 4 to 11 mol %, and particularly preferably 5 to 10 mol % to the binder (the concentration of the polyacene additive is based on [the base material of the binder+the polyacene additive+the other additive when present]. The number of moles of a polymer such as the base material of the binder is defined as the number of moles with the molecule of the polymer itself as a unit particle).

The addition of the polyacene additive to the binder can be confirmed by analyzing an absorption wavelength according to, for example, Ultraviolet-visible absorption spectroscopy. For example, the absorption wavelength of the anthracene is about 375 nm, and the absorption wavelength of the naphthalene is about 312 nm. When the binder has a substituent group, the binder has an absorption wavelength slightly changed from that of the substituent group. However, the polyacene additive is considered to be present when a value closer to the absorption wavelengths is observed.

The active material used in the present embodiment has a structure corresponding to the polyacene in the closest-packed crystal plane in the crystal structure. Examples thereof include a carbonaceous material or a lithium-containing composite oxide having a crystal structure in which a distance between nearest oxygen atoms is 0.19 to 0.29 nm.

The carbonaceous material is a graphite-based material, and is mainly used as a negative electrode active material. Examples of the carbonaceous material include materials obtained by thermally treating graphitizable materials obtained from natural graphite, flaky or massive artificial graphite, petroleum coke, or coal pitch coke, or the like at a temperature of 2500° C. or higher; mesophase pitch graphite; amorphous carbon obtained by firing, for example, furan resins such as furfuryl alcohol; and carbon fibers.

The lithium-containing composite oxide is mainly used as a positive electrode active material. However, the lithium-containing composite oxide may be used as a negative electrode active material. Examples of the lithium-containing composite oxide in which a distance between nearest oxygen atoms is 0.19 to 0.29 nm include $LiCoO_2$, $LiNiO_2$, and $Li_2MnO_3$. The distance between nearest oxygen atoms in the lithium-containing composite oxide is more preferably within a range of 0.19 to 0.29 nm from the viewpoint of the interaction with the polyacene, or the like.

A conductive material is preferably added to the electrode coating ink for the purpose of improving the electrical conductivity of the electrode. Examples of the conductive material include carbon fine particles and carbon fibers. Specifically, carbon black, acetylene black, channel black, thermal black, carbon nanotubes, and carbon nanohorns or the like can be used. The conductive materials are not limited to these materials, as long as they can impart electrical conductivity, and metallic materials and electroconductive polymers may also be used. These materials may be used by mixture. The conductive material is contained in an amount of preferably 50 to 100 parts by weight, and particularly preferably 60 to 90 parts by weight, based on 100 parts by weight of the active material, although the amount of the conductive material to be used is not particularly limited.

A dispersion solvent used to prepare the electrode coating ink is not particularly limited as long as each component can be dissolved in the dispersion solvent. N-methyl-2-pyrolidone (NMP), dimethylacetamide, dimethylformamide, and dimethylformamide or the like can be used. The dispersion solvent is preferably NMP.

As the current collector, for example, a metal foil including aluminum and copper or the like can be used. As a method for applying the positive electrode coating ink to the current collector, a conventionally well-known method can be used. The positive electrode coating ink can be applied by using a suitable apparatus such as a bar coater, a gravure coater, a comma coater, a slit coater, a die coater, a doctor blade, a cast apparatus, or a spray apparatus.

The coated surface of the positive electrode coating ink applied to the current collector can be suitably compressed and/or ground by a smoothing treatment such as pressing. The treatment can also be performed according to a conventionally well-known method such as a roll pressing method or a flat-plate pressing method. Smoothing of the coated surface and/or compression of the coated layer may be performed multiple times so as to give a desired surface smoothness and a desired thickness of the coated layer.

2. Separator

A separator for the lithium ion secondary battery of the present embodiment may be a separator of any material, as long as the separator can separate the positive electrode and the negative electrode from each other to prevent a short circuit, and does not adversely affect the battery. Specific examples of the separator include a separator including a polymer such as polyolefin, polyamide, or polyester; and a separator including a glass cloth using glass fiber. The separator including the polyolefin is particularly preferable. Examples of the polyolefin include polyethylene and polypropylene. Films including these materials and laid on each other can be used as the separator. The separator has a gas permeability (sec/100 mL) of preferably within the range of 10 to 1000, more preferably 50 to 800, and particularly preferably 90 to 700.

3. Nonaqueous Electrolyte Solution

A nonaqueous electrolyte solution containing a nonaqueous solvent (organic solvent) and an electrolytic salt can be used for the lithium ion secondary battery.

The nonaqueous solvent is not particularly limited. However, the nonaqueous solvent preferably has a high dielectric constant. Esters including carbonates are more preferable. Among them, esters having a dielectric constant of 30 or more are particularly preferably used. Examples of the esters having a high dielectric constant include ethylene carbonate, propylene carbonate, butylene carbonate, γ-butyrolactone, and sulfur esters (for example, ethylene glycol sulfite). Cyclic esters are preferable among these, and cyclic carbonates such as ethylene carbonate, vinylene carbonate, propylene carbonate, butylene carbonate, and fluoroethylene carbonate are particularly preferable. Low-viscosity polar chain carbonate compounds and aliphatic branched carbonate compounds typified by dimethyl carbonate, diethyl carbonate, and methyl ethyl carbonate or the like can also be used. A mixture solvent of a cyclic carbonate and a chain carbonate is preferable. Above all, a mixture of ethylene carbonate, dimethyl carbonate, and ethyl methyl carbonate is particularly preferable.

Aliphatic alkyl esters such as methyl propionate; alkyl ester phosphates such as trimethyl phosphate and triethyl phosphate; nitrile solvents such as 3-methoxypropionitrile; and branched compounds having an ether bond, typified by dendrimers and dendrons, or the like can also be used as the nonaqueous solvent.

A solvent of a fluorine system can also be used as the nonaqueous solvent. As a solvent of a fluorine system, for example, $H(CF_2)_2OCH_3$, $C_4F_9OCH_3$, $H(CF_2)_2OCH_2CH_3$, $H(CF_2)_2OCH_2CF_3$, and $H(CF_2)_2CH_2O(CF_2)_2H$, etc., or (perfluoroalkyl)alkyl ether of straight-chain structure, such as $CF_3CHFCF_2OCH_3$ and $CF_3CHFCF_2OCH_2CH_3$, or iso (perfluoroalkyl)alkyl ether, i.e., 2-trifluoromethyl hexafluoro propylmethyl ether, 2-trifluoromethyl hexafluoro propylethyl ether, 2-trifluoromethyl hexafluoro propyl propyl ether, 3-trifluoro octafluoro butylmethyl ether, 3-trifluoro octafluoro butylethyl ether, 3-trifluoro octafluoro butyl propyl ether, 4-trifluoro decafluoro pentylmethyl ether, 4-trifluoro decafluoro pentylethyl ether, 4-trifluoro decafluoro pentyl propyl ether, 5-trifluoro dodecafluoro hexylmethyl ether, 5-trifluoro dodecafluoro hexylethyl ether, 5-trifluoro dodecafluoro hexyl propyl ether, 6-trifluorotetradeca fluoroheptyl methyl ether, 6-trifluorotetradeca fluoroheptyl ethyl ether, 6-trifluorotetradeca fluoroheptyl propyl ether, 7-trifluoro- hexadeca fluorooctyl methyl ether, 7-trifluorohexadeca fluorooctyl ethyl ether and 7-trifluorohexadeca fluorohexyl octyl ether, etc. are mentioned.

Furthermore, the iso(perfluoroalkyl)alkyl ether can be used in combination with the (perfluoroalkyl)alkyl ether of straight-chain structure.

Lithium salts such as lithium perchlorate, organic boron lithium salts, lithium salts of fluorine-containing compounds, and lithium imide salts can be used as the electrolytic salt. Specific examples thereof include $LiClO_4$, $LiPF_6$, $LiBF_4$, $LiAsF_6$, $LiSbF_6$, $LiCF_3SO_3$, $LiCF_3CO_2$, $Li_2C_2F_4(SO_3)_2$, $LiN(CF_3SO_2)$ $LiN(C_2F_5SO_2)_2$, and $LiC(CF_3SO_2)_3$. Among these lithium salts, fluorine-containing organic lithium salts can be suitably used.

The electrolytic salt is contained in the nonaqueous electrolyte solution, in a concentration of preferably 0.3 mol/L or more, and particularly preferably 0.7 mol/L or more, and in a concentration of preferably 1.7 mol/L or less, and particularly preferably 1.2 mol/L or less. This range does not provide insufficient ionic conductivity caused by an excessively low electrolytic concentration, and does not provide precipitation of the electrolytic salt which is too much to dissolve.

The nonaqueous electrolyte solution may further contain various additives to improve battery performance. For example, a nonaqueous electrolyte solution containing a compound intramolecularly having a C=C unsaturated bond can possibly suppress a decrease in charge/discharge cycle properties of the battery. Examples of the compound intramolecularly having a C=C unsaturated bond include aromatic compounds such as $C_6H_5C_6H_{11}$ (phenylcyclohexane); fluorinated aliphatic compounds such as $H(CF_2)_4CH_2OOCCH=CH_2$ and $F(CF_2)_8CH_2CH_2OOCCH=CH_2$; and fluorine-containing aromatic compounds. Compounds having sulfur element (such as, chain or cyclic sulfonic acid esters, and chain or cyclic sulfate esters) including 1,3-propane sultone and 1,2-propanediol sulfate ester; vinylene carbonate; vinylethylene carbonate; and fluorinated ethylene carbonate, or the like can also be used. These various additives are preferably contained in an amount of, for example, 0.05 to 5 parts by weight based on the total weight of the nonaqueous electrolyte solution.

EXAMPLES

In order to demonstrate an effect of the present embodiment, an intrusion rate (average diffusion rate) of lithium in an electrode was measured by a pulsed field gradient NMR method (PFG-NMR method). This method is performed by using a decrease in an echo signal (echo signal) according to diffusion. The echo signal represents resonance with a supplied pulse magnetic field. Specifically, the larger a diffusion coefficient is, the weaker the echo signal is. D is determined by using the relationship between an echo signal E and a diffusion coefficient D having $E=\exp(-\alpha D)$ ($\alpha$ is a coefficient).

Measurement samples were prepared, which were obtained by combining styrene-butadiene rubber (SBR) or polyimide (Kapton) as a base material of a binder with naphthalene, anthracene, or tetracene as a polyacene additive. All the concentrations of the polyacene additives were set to 5 mol %. A measurement sample excluding a polyacene additive was also prepared as a reference. The base material of the binder, graphite powder, and the polyacene additive were dispersed in water, and carboxymethyl cellulose (CMC) as a thickener was further added to the dispersed water to prepare the samples.

Figure 5:
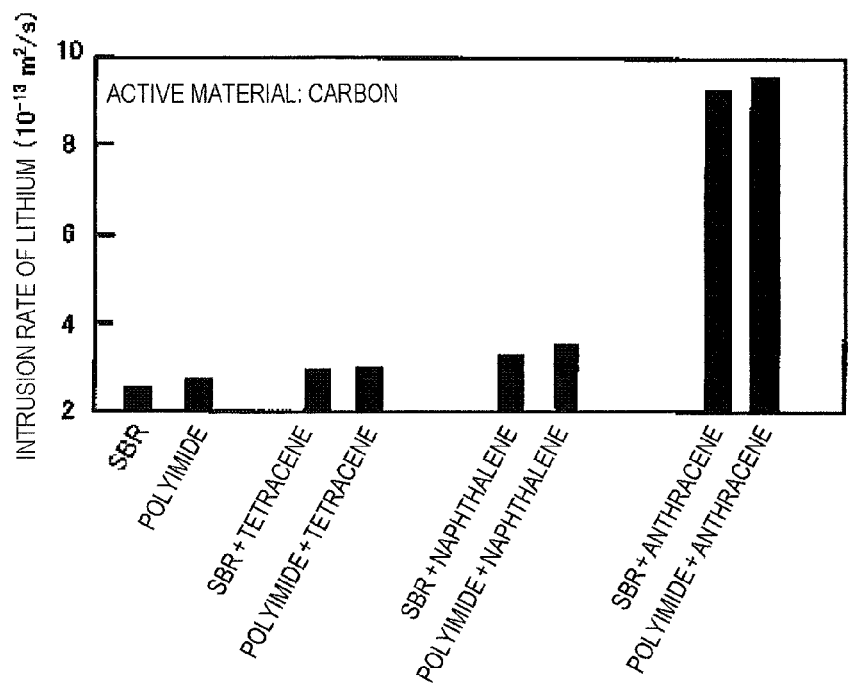
FIG. 5 is a graph illustrating measurement results of an intrusion rate of lithium when carbon is used as an active material.
Figure 6:
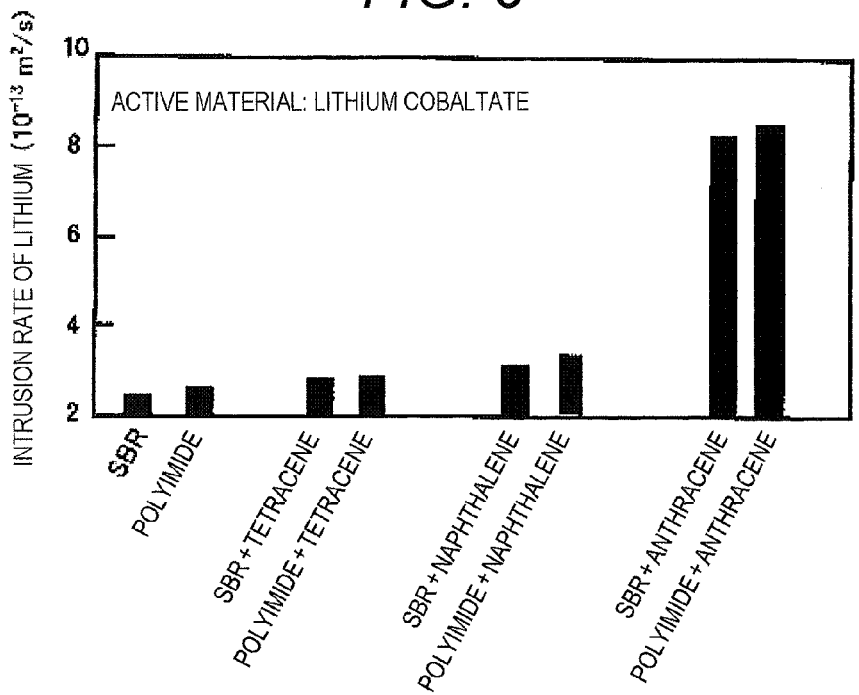
FIG. 6 is a graph illustrating measurement results of an intrusion rate of lithium when lithium cobaltate is used as an active material.

FIG. 5 is a graph illustrating measurement results of an intrusion rate of lithium when carbon (graphite) is used as an active material. FIG. 6 is a graph illustrating measurement results of an intrusion rate of lithium when lithium cobaltate is used as an active material. As compared with the reference excluding the polyacene additive, all the intrusion rates of lithium when the polyacene additive was added were improved. Particularly, when the anthracene was used as the polyacene additive, the intrusion rate of lithium was notably improved.

Figure 7:
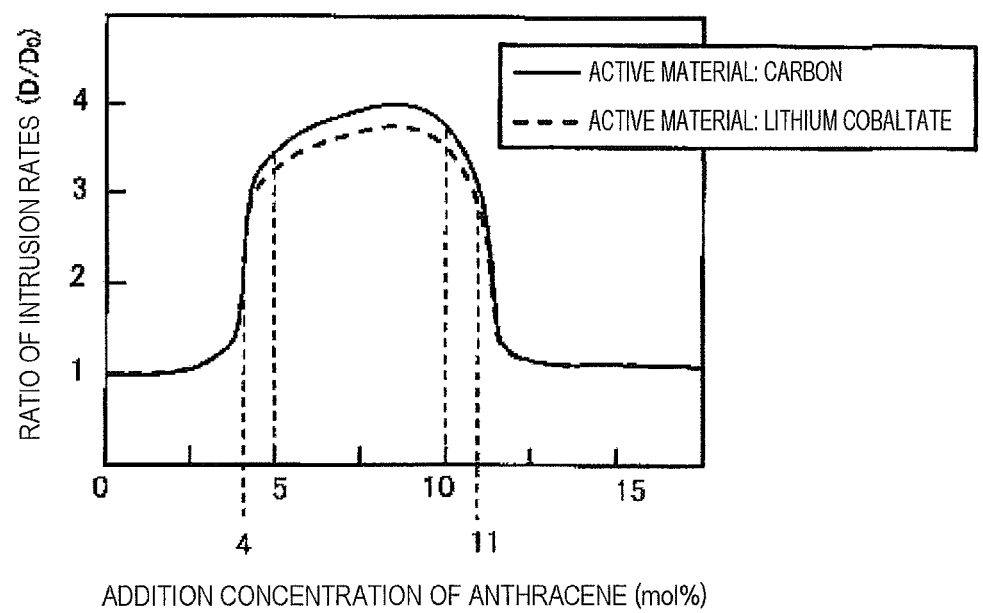
FIG. 7 illustrates the relationship between an addition concentration of anthracene and an intrusion rate of lithium.

FIG. 7 illustrates the relationship between an addition concentration of anthracene and an intrusion rate of lithium. In FIG. 7, styrene-butadiene rubber was used as the base material of the binder, and a ratio $D/D_0$ of an intrusion rate $D$ of lithium when the anthracene is added, to an intrusion rate $D_0$ of lithium when the polyacene additive is not added is plotted for the addition concentration of the anthracene. The value of $D/D_0$ can be said to directly exhibit an effect provided by adding the anthracene. As is obvious from FIG. 7, when the addition concentration of the anthracene was set to 4 to 11 mol % in both the carbon and lithium cobaltate used as the active material, and particularly when the addition concentration was set to 5 to 10 mol %, a remarkable improvement in an intrusion rate was observed. The same tendency was obtained also when a lithium nickelate and a lithium manganite or the like were used as the active material.

All the printed publications, patents, and patent applications cited herein are incorporated herein by reference as it is.

The invention claimed is:

1. A lithium ion secondary battery comprising a binder that binds an active material to a current collector in at least one of a positive electrode and a negative electrode, wherein
the binder comprises a base material made of a resin having a benzene ring, and 4 to 11 mol % of a polyacene additive which is anthracene, or a derivative of thereof,
the active material is a carbonaceous material or a lithium-containing composite oxide having a crystal structure in which a distance between nearest oxygen atoms is 0.19 to 0.29 nm, and
the polyacene additive adhering to a closest packed crystal plane of the active material with the base material attracted to the polyacene additive by an intermolecular interaction.

2. The lithium ion secondary battery according to claim 1, wherein the resin having a benzene ring is selected from styrene-butadiene rubber or aromatic polyimide.

3. The lithium ion secondary battery according to claim 2, wherein the active material is a lithium-containing composite oxide selected from $LiCoO_2$, $LiNiO_2$, and $Li_2MnO_3$.

4. The lithium ion secondary battery according to claim 1, wherein the active material is a lithium-containing composite oxide selected from $LiCoO_2$, $LiNiO_2$, and $Li_2MnO_3$.

5. An electrode of a lithium ion battery comprising a binder that binds an active material to a current collector, wherein:
the binder comprises a base material made of a resin having a benzene ring, and 4 to 11 mol % of a polyacene additive which is anthracene or a derivative thereof;
the active material is a carbonaceous material or a lithium-containing composite oxide having a crystal structure in which a distance between nearest oxygen atoms is 0.19 to 0.29 nm; and
the polyacene additive adhering to a closest packed crystal plane of the active material with the base material attracted to the polyacene additive by an intermolecular interaction.

6. The electrode according to claim 5, wherein the resin has a benzene ring is selected from styrene-butadiene rubber or aromatic polyimide.

7. The electrode according to claim 6, wherein the active material is a lithium-containing composite oxide selected from $LiCoO_2$, $LiNiO_2$, and $Li_2MnO_3$.

8. The electrode according to claim 5, wherein the active material is a lithium-containing composite oxide selected from $LiCoO_2$, $LiNiO_2$, and $Li_2MnO_3$.

9. A binder for producing an electrode of a lithium ion secondary battery, wherein the electrode uses an active material which is a carbonaceous material or a lithium-containing composite oxide having a crystal structure in which a distance between nearest oxygen atoms is 0.19 to 0.29 nm, the binder comprising a resin having a benzene ring, and 4 to 11 mol % of a polyacene additive which is anthracene or a derivative thereof; and
the polyacene additive selected such that it adheres to a closest packed crystal plane of the active material with the base material attracted to the polyacene additive by an intermolecular interaction upon a heating step in the production of the electrode.

10. The binder according to claim 9, wherein the resin has a benzene ring is selected from styrene-butadiene rubber or aromatic polyimide.

* * * * *